(12) United States Patent
Baitaxe et al.

(10) Patent No.: US 11,562,576 B2
(45) Date of Patent: Jan. 24, 2023

(54) DYNAMIC ADJUSTMENT OF AUGMENTED REALITY IMAGE

(71) Applicant: GM Global Technology Operations LLC, Detroit, MI (US)

(72) Inventors: Michael Baitaxe, Ra'anana (IL); Dan Levi, Kiryat Ono (IL); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 377 days.

(21) Appl. No.: 16/985,377

(22) Filed: Aug. 5, 2020

(65) Prior Publication Data

US 2022/0044032 A1   Feb. 10, 2022

(51) Int. Cl.
| | |
|---|---|
| G06V 20/56 | (2022.01) |
| B60W 50/14 | (2020.01) |
| G02B 27/01 | (2006.01) |
| G06T 19/00 | (2011.01) |
| G06V 20/20 | (2022.01) |
| G06V 20/59 | (2022.01) |

(52) U.S. Cl.
CPC ........... *G06V 20/588* (2022.01); *B60W 50/14* (2013.01); *G02B 27/0101* (2013.01); *G06T 19/006* (2013.01); *G06V 20/20* (2022.01); *G06V 20/597* (2022.01); *B60W 2050/146* (2013.01); *B60W 2540/225* (2020.02)

(58) Field of Classification Search
CPC ...... B60W 50/14; B60W 30/02; B60W 40/06; B60W 2050/146; B60W 2540/225; G02B 27/01; G02B 27/0101; G02B 27/0093; G02B 27/0179; G02B 2027/0138; G02B 2027/014; G06T 19/20; G06T 15/00; G06T 19/006; G06T 2219/2004; G06V 20/588; G06V 20/20; G06V 20/597; B60K 2370/1529; B60K 2370/166; B60K 2370/177; B60K 2370/21; B60K 35/00
See application file for complete search history.

(56) References Cited

U.S. PATENT DOCUMENTS

| | | | |
|---|---|---|---|
| 2011/0301813 A1* | 12/2011 | Sun ...................... | B62D 15/029 348/148 |
| 2012/0224060 A1* | 9/2012 | Gurevich ............... | G06V 20/58 348/148 |
| 2016/0084661 A1* | 3/2016 | Gautama ................ | G01C 21/26 701/400 |
| 2016/0214617 A1* | 7/2016 | Arndt .................... | G06V 20/588 |
| 2016/0349066 A1* | 12/2016 | Chung ............... | G01C 21/3658 |

(Continued)

FOREIGN PATENT DOCUMENTS

| | | | | |
|---|---|---|---|---|
| CN | 109624851 A | * | 4/2019 | ............... B60R 1/00 |
| KR | 20130012629 A | * | 7/2011 | |

*Primary Examiner* — Nizar N Sivji
(74) *Attorney, Agent, or Firm* — Cantor Colburn LLP (57) ABSTRACT

A system and method to adjust an augmented reality (AR) image involve a front-facing camera in a vehicle. The camera obtains an image that includes a road surface ahead of the vehicle. The system also includes a processor to detect lane lines of the road surface in three dimensions, to perform interpolation using the lane lines to determine a ground plane of the road surface, and to adjust the AR image to obtain an adjusted AR image such that all points of the adjusted AR image correspond with points on the ground plane.

20 Claims, 8 Drawing Sheets

(56) References Cited

U.S. PATENT DOCUMENTS

| | | | | |
|---|---|---|---|---|
| 2018/0328752 A1* | 11/2018 | Tomatsu | ............... | G01C 21/365 |
| 2019/0143816 A1* | 5/2019 | Wakatsuki | ......... | G02B 27/0101 |
| | | | | 345/632 |
| 2019/0188912 A1* | 6/2019 | Kamini | ................. | B60W 40/00 |
| 2019/0311546 A1* | 10/2019 | Tay | ........................... | G06T 5/50 |
| 2020/0104607 A1* | 4/2020 | Kim | ......................... | G06T 7/70 |
| 2020/0180619 A1* | 6/2020 | Lee | ....................... | B60W 50/14 |
| 2020/0393263 A1* | 12/2020 | Kleen | .................... | G02B 27/01 |
| 2021/0107356 A1* | 4/2021 | Watanabe | .............. | G06V 20/56 |

* cited by examiner

DYNAMIC ADJUSTMENT OF AUGMENTED REALITY IMAGE

INTRODUCTION

The subject disclosure relates to dynamic adjustment of an augmented reality image.

Vehicles (e.g., automobiles, trucks, construction equipment, farm equipment) are increasingly equipped to obtain information about the vehicle and its surroundings and to provide information to a person in the vehicle. Exemplary interfaces include an infotainment system and a head-up display (HUD). The infotainment system may include a monitor to display a map or an image obtained by a camera of the vehicle. The HUD involves a projection of an image onto the windshield of the vehicle, for example. An augmented reality (AR) image refers to an image that enhances a real-world image. For example, the image of the road ahead obtained by a camera in the front of the vehicle can be augmented with an AR image of an arrow to indicate an upcoming turn. As another example, instead of displaying speed or other data, the HUD may project an AR image that augments what the driver sees through the windshield. Road dynamics or other sources of changes in the relative orientation of the vehicle to the outside world can lead to the AR image being displayed in the wrong place (e.g., the arrow indicating direction is projected onto the side of the road in the camera image rather than onto the road). Accordingly, it is desirable to provide dynamic adjustment of an AR image.

SUMMARY

In one exemplary embodiment, a system to adjust an augmented reality (AR) image includes a front-facing camera in a vehicle to obtain an image that includes a road surface ahead of the vehicle. The system also includes a processor to detect lane lines of the road surface in three dimensions, to perform interpolation using the lane lines to determine a ground plane of the road surface, and to adjust the AR image to obtain an adjusted AR image such that all points of the adjusted AR image correspond with points on the ground plane.

In addition to one or more of the features described herein, the processor obtains a base image that shows the road surface.

In addition to one or more of the features described herein, the processor adds the adjusted AR image to the base image for display to a driver of the vehicle.

In addition to one or more of the features described herein, the processor obtains the base image from the camera or a second front-facing camera in the vehicle.

In addition to one or more of the features described herein, the processor monitors eye position of a driver of the vehicle.

In addition to one or more of the features described herein, the processor determines a head-up display region on a windshield of the vehicle to correspond with the eye position of the driver.

In addition to one or more of the features described herein, the processor projects the adjusted AR image in the head-up display region.

In addition to one or more of the features described herein, the processor adjusts the AR image based on a rotation and a translation of the points on the ground plane.

In addition to one or more of the features described herein, the processor detects an object on the road surface directly ahead of the vehicle from the image.

In addition to one or more of the features described herein, the processor selects or creates the adjusted AR image size based on the road surface between the vehicle and a position of the object.

In another exemplary embodiment, a method of adjusting an augmented reality (AR) image includes obtaining an image from a front-facing camera in a vehicle, the image including a road surface ahead of the vehicle. The method also includes detecting lane lines of the road surface in three dimensions, and performing interpolation using the lane lines to determine a ground plane of the road surface. The AR image is adjusted to obtain an adjusted AR image such that all points of the adjusted AR image correspond with points on the ground plane.

In addition to one or more of the features described herein, the method also includes obtaining a base image that shows the road surface.

In addition to one or more of the features described herein, the method also includes the processor adding the adjusted AR image to the base image for display to a driver of the vehicle.

In addition to one or more of the features described herein, the obtaining the base image is from the camera or a second front-facing camera in the vehicle.

In addition to one or more of the features described herein, the method also includes the processor monitoring eye position of a driver of the vehicle.

In addition to one or more of the features described herein, the method also includes the processor determining a head-up display region on a windshield of the vehicle to correspond with the eye position of the driver.

In addition to one or more of the features described herein, the method also includes the processor projecting the adjusted AR image in the head-up display region.

In addition to one or more of the features described herein, the adjusting the AR image is based on a rotation and a translation of the points on the ground plane.

In addition to one or more of the features described herein, the method also includes the processor detecting an object on the road surface directly ahead of the vehicle from the image.

In addition to one or more of the features described herein, the method also includes the processor selecting or creating the adjusted AR image size based on the road surface between the vehicle and a position of the object.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, an AR image can be added to an image of the real world (e.g., obtained by a vehicle camera and displayed by the infotainment system) or can be projected onto a view of the real world (e.g., in the form of a HUD). Embodiments of the systems and methods detailed herein involve dynamic adjustment of the AR image. While driving, AR images may be shown on a road surface or other road feature. As also previously noted, an AR image may be presented in the wrong place on the image of the real-world or in the view of the real world due to changes in the relative orientation of the vehicle to the road surface. This can happen if the road ahead is not flat. The relative orientation can also change when the vehicle has an inclination angle (e.g., due to a heavy load in the trunk) even if the road is flat. A change in the position of the vehicle relative to the road can also lead to the issue. Finally, other vehicles or objects being in the field of view may require a change in the position or other aspect of the AR symbol.

A prior approach to addressing the relative orientation issue includes creating an accurate terrain map beforehand. Then, with accurate vehicle localization and inclination, the orientation of the vehicle to the road surface at a given position is known. However, this requires driving over all potential terrain to obtain the terrain map. Also, sensors are needed for the localization and inclination information. Further, the presence of other vehicle or objects in real time cannot be addressed with this approach. Another prior approach includes using a three-dimensional sensor such as a light detection and ranging (lidar) system. However, lidar systems are not generally available in vehicles and the processing of data obtained by the lidar system is generally more processor intensive than the processing of data obtained by other sensors (e.g., camera, radar system).

According to one or more embodiments detailed herein, a single image from a single camera is used to obtain information about road geometry or structure for a section of road. The camera may be a front-facing camera that is already generally available in vehicles. Additional techniques to reduce lag and improve accuracy are also presented. According to an exemplary embodiment, road geometry is determined for upcoming sections of road that are captured by the camera. According to another exemplary embodiment, a large section of road can be divided into subsections such that the road geometry of each subsection are determined more accurately.

Figure 1:
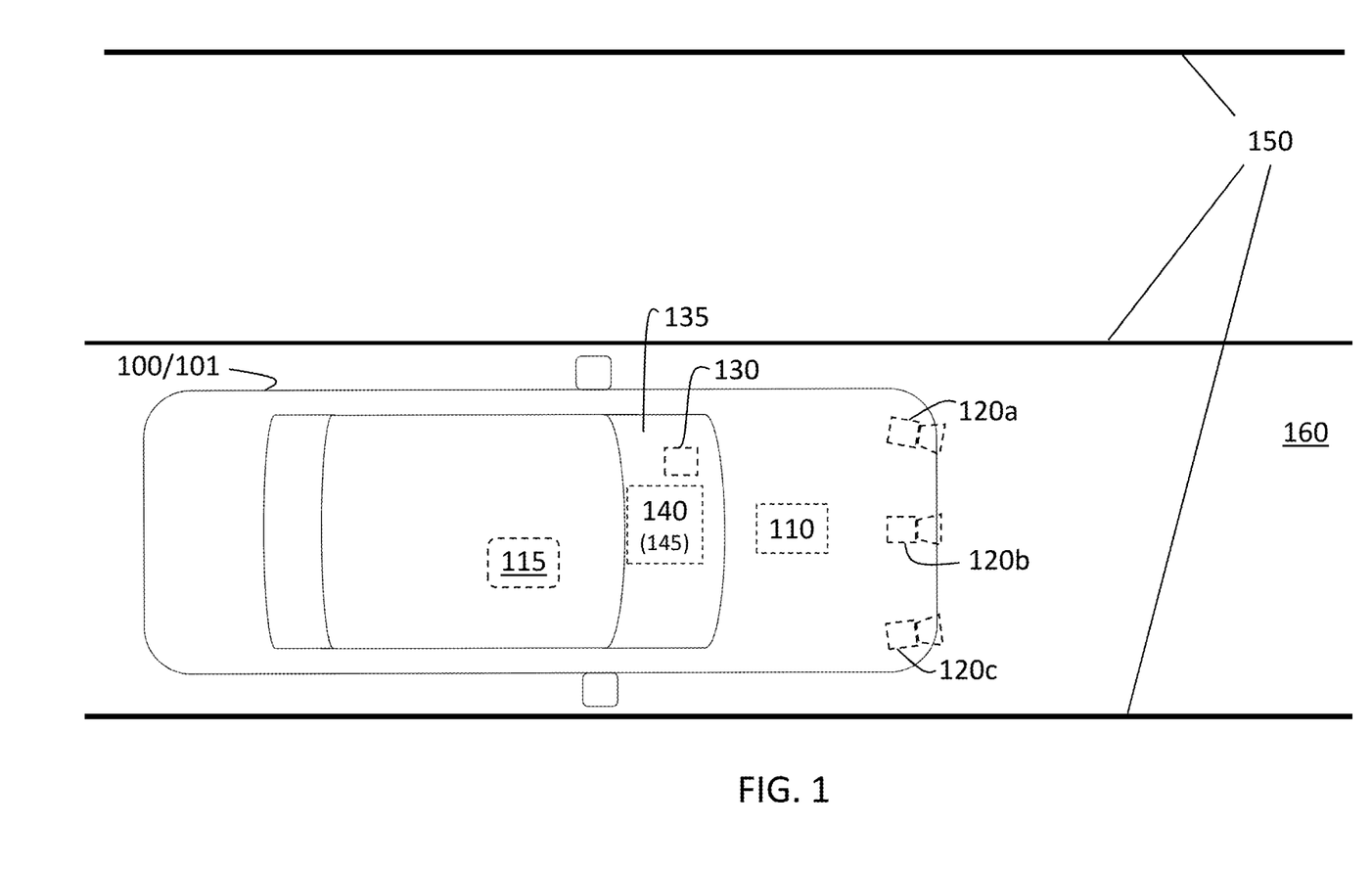
FIG. 1 is a block diagram of a vehicle that performs dynamic adjustment of an augmented reality (AR) image according to one or more embodiments.
Figure 2:
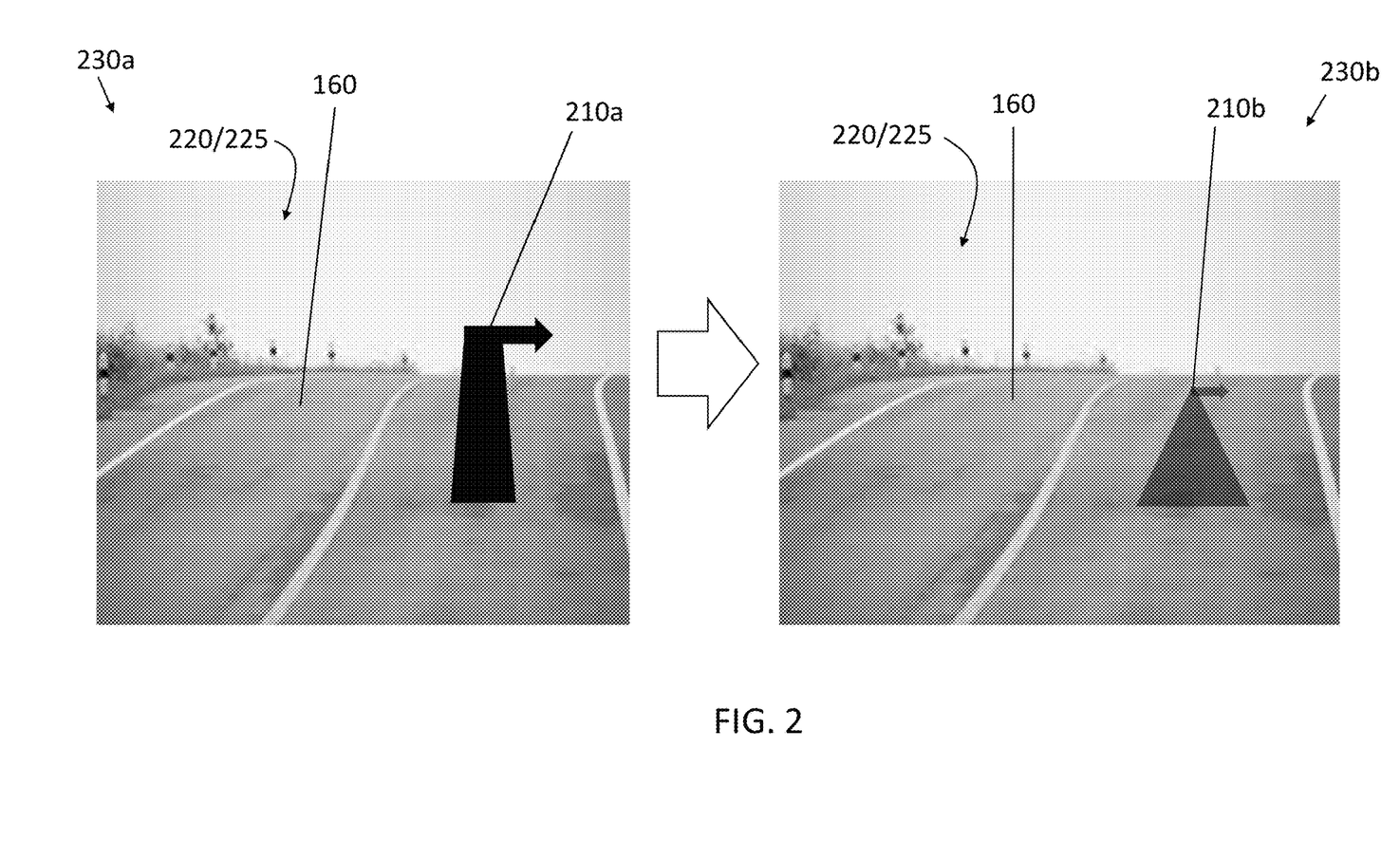
FIG. 2 illustrates adjustment of an AR image according to one or more embodiments.

In accordance with an exemplary embodiment, FIG. 1 is a block diagram of a vehicle 100 that performs dynamic adjustment of an AR image 210 (FIG. 2). The exemplary vehicle 100 shown in FIG. 1 is an automobile 101. Lane lines 150 are indicated on the road 160 on which the vehicle 100 is shown. The vehicle 100 includes a controller 110 that performs the dynamic adjustment of the AR image 210 as detailed herein. The controller 110 may also perform functions of the electronic control unit (ECU) of the vehicle 100 or communicate with the ECU. Exemplary functions of the ECU may include semi-autonomous actions such as automatic braking and adaptive cruise control. The controller 110 includes processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. Three non-limiting exemplary front-facing cameras 120a, 120b, 120c (generally referred to as 120) are shown.

The controller 110 may obtain an image 220 (FIG. 2) of the road 160 ahead of the vehicle 100 from camera 120b, for example, to perform the dynamic adjustment of the AR image 210. One of the other cameras 120a, 120c or the camera 120b itself may provide an image 220 (referred to as a base image 225 (FIG. 2) for explanatory purposes) to which the AR image 210 is added to create a complete image 230 (FIG. 2). That is, the camera 120 that obtains the image 220 that is used to determine geometry of the road 160 to facilitate adjustment of the AR image 210 may be, but need not be, the same camera 120 that obtains the base image 225 that is augmented by the AR image 210 to create the complete image 230. When different cameras 120 are used, the relative positions of the two cameras 120 in the vehicle 100 must be considered to ensure that the AR image 210 that is adjusted based on one image 220 from one camera 120 is added to the correct position in the base image 225 obtained by another camera 120. The numbers and positions of the cameras 120 shown in FIG. 1 are only one example. In alternate embodiments, another camera 120 located elsewhere that obtains an image 220 of the road 160 ahead of the vehicle 100 may be used to perform the dynamic adjustment of the AR image 210.

A HUD region 130 is shown on the windshield 135 of the vehicle 100. The HUD region 130 corresponds with the location of the eye 310 (FIG. 3) of the driver 330 (FIG. 3) such that images projected in the HUD region 130 will be visible to the driver 330. Because the location of the eye 310 moves, the location of the HUD region 130 on the windshield 135 moves based on monitoring of the eye 310. An infotainment system 140 is shown in the dashboard of the vehicle 100, below the windshield 135 according to the view in FIG. 1. The infotainment system 140 includes a display 145 that may show a base image 225 obtained by one of the cameras 120 along with an AR image 210 that is adjusted according to one or more embodiments. The base image 225 and adjusted AR image 210 (i.e., the complete image 230) may be displayed on a tablet or phone or any device 115 connected, in a wired or wireless manner, to the controller 110 according to alternate embodiments. The device 115 may be inside the vehicle 100, as shown, or outside the vehicle 100. An exemplary adjustment of an AR image 210 is illustrated in FIG. 2

FIG. 2 illustrates adjustment of an AR image 210 according to one or more embodiments. Continuing reference is made to FIG. 1. Two complete images 230a, 230b (generally referred to as 230) are shown. A complete image 230 may refer to a real-world view of a road 160 with an AR image 210 projected on it in a HUD region 130. According to the exemplary case shown in FIG. 2, a complete image 230 may instead refer to a base image 225 of the road 160 with the AR image 210 added and displayed on the display 145 of the infotainment system 140 or a screen of another device (e.g., tablet, phone). As previously noted, an image 220 obtained with any one of the cameras 120 may be used to determine road geometry. As also noted, an image 220 obtained with any of the cameras 120 may be used as a base image 225 to which AR image 210 is added to create a complete image 230. The complete image 230a shows that the road 160 rises (i.e., elevation of the road 160 increases ahead of the vehicle 100) and then levels and that, without any adjustment to account for this elevation change, the AR image 210a is misplaced. As complete image 230a indicates, the AR image 210a of the arrow appears to rise above the road 160 rather than being projected entirely on the surface of the road 160.

The complete image 230b shows the same road 160 ahead of the vehicle 100. However, as FIG. 2 indicates, the AR image 210b is adjusted from the AR image 210a so that it appears entirely on the surface of the road 160. The surface of the road 160 is specifically discussed as a target for the projection of the AR image 210 for explanatory purposes. A change in orientation of the vehicle 100 to the road 160 may also affect the placement of an AR image 210 on a signpost next to the road 160 or another location, for example. As further discussed with reference to FIG. 4, the determination of the relative orientation involves determining the geometry of the road 160.

Figure 3:
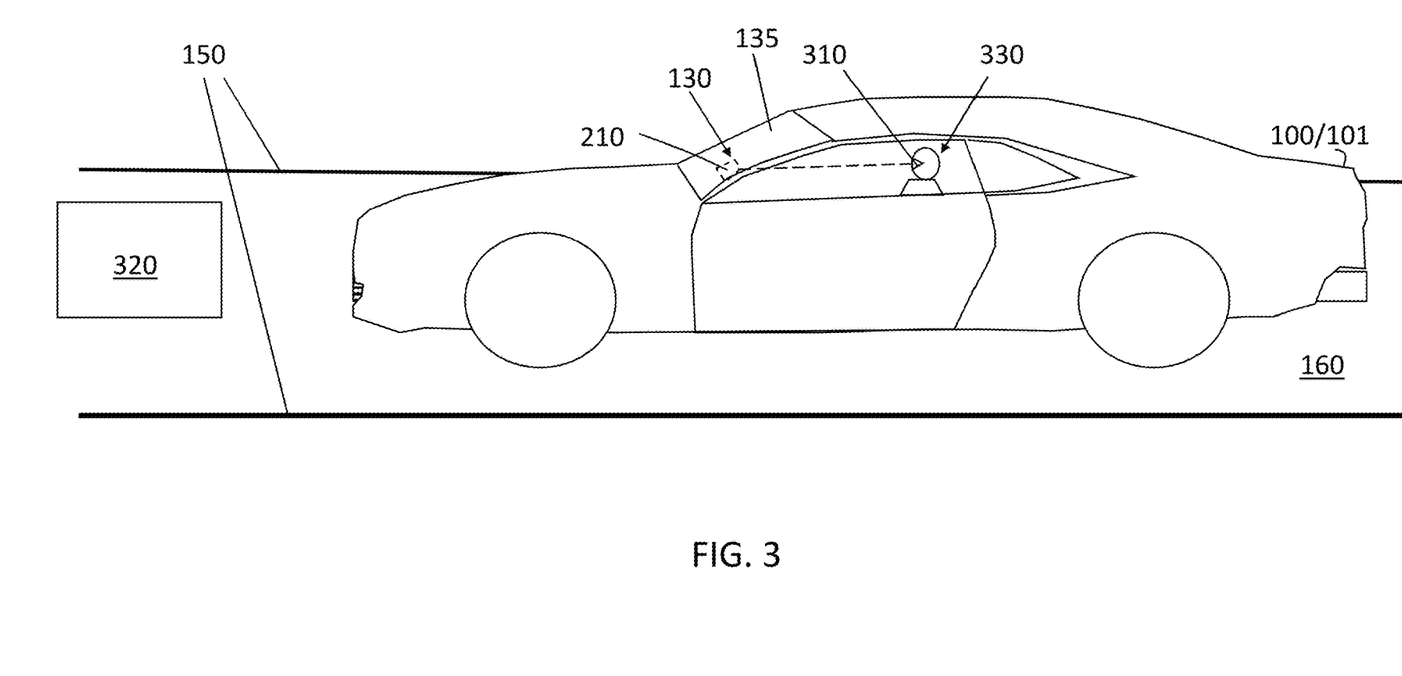
FIG. 3 shows a vehicle that performs dynamic adjustment of an AR image according to one or more embodiments.

FIG. 3 shows a vehicle 100 that performs dynamic adjustment of an AR image 210 according to one or more embodiments. A side view of the vehicle 100 is shown between lane lines 150. In the exemplary case shown in FIG. 3, the AR image 210 is displayed in the HUD region 130 of the windshield 135. Thus, in this case, there is no base image 225 to which the AR image 210 is added. Instead, the AR image 210 in the HUD region 130 of the windshield 135 appears directly on the real-world view of the road 160. FIG. 3 shows an object 320 (e.g., another vehicle 100) on the road 160 ahead. In addition to road geometry, this other object 320 must also be considered in adjusting the AR image 210, as further discussed with reference to FIG. 4. For the AR image 210 to appear in the right place, the HUD region 130 of the windshield 135, which corresponds with the location of the driver's eye(s) 310, is determined by locating the driver's eye position by tracking the position of one or both eyes 310 of the driver 330 using a known head and eye-tracking process. Unlike a camera 120 that obtains images 220, the eye 310 is unlikely to remain in one position with respect to the vehicle 100. Thus, adjusting the AR image 210 based on the geometry of the road 160 additionally includes real-time tracking of movement of the eye 310, as discussed with reference to FIGS. 4 and 6.

Figure 4:
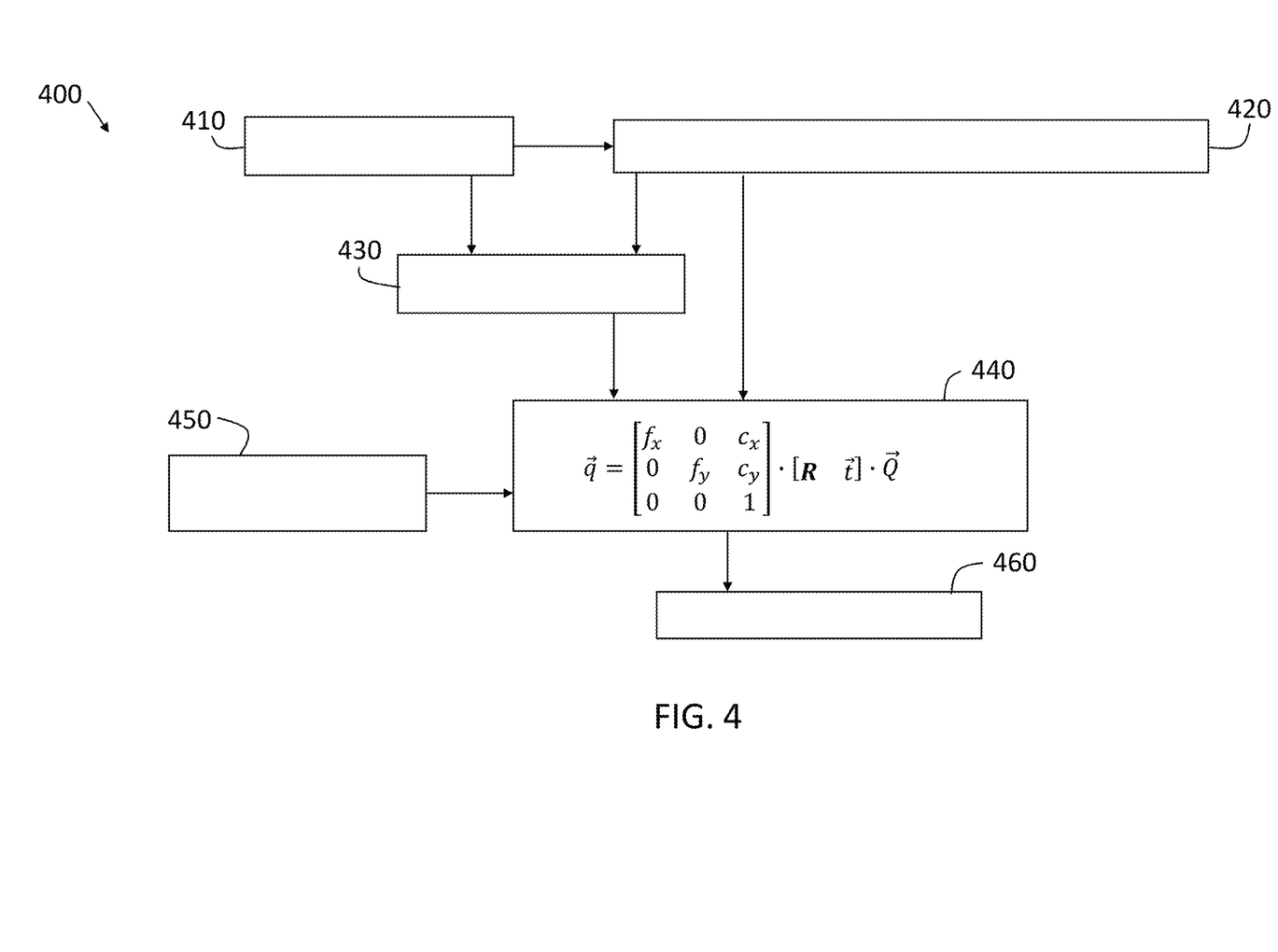
FIG. 4. is a process flow of a method of performing dynamic adjustment of an AR image according to various embodiments.

FIG. 4 is a process flow of a method 400 of performing dynamic adjustment of an AR image 210 according to various embodiments. The process flow may be performed by the controller 110, for example. At block 410, obtaining an image 220 refers to obtaining an image of the road 160 ahead of the vehicle 100 with one of the front-facing cameras 120 shown in FIG. 1, for example. At block 420, extracting road geometry is further discussed with reference to FIG. 5. The coordinate system $\vec{N}_G$ of the ground plane $P_G$ is determined. At block 420, in addition to road geometry, information about objects 320 (e.g., other vehicles 100) on the road 160 is also obtained. This information is used to avoid projecting an AR image 210 onto the object 320 when it is supposed to be projected on a surface of the road 160.

At block 430, selecting the AR image 210 may refer to creating the image or choosing the image from predefined images. The road geometry information extracted and the object 320 information obtained at block 420 may affect the creation or selection of the AR image 210. For example, if there is an object 320 (e.g., another vehicle 100) directly ahead of the vehicle 100, the dimensions of the surface of the road 160 onto which the AR image 210 is projected may be reduced and, thus, may limit the size of the AR image 210 that is created or selected.

At block 440, a homography is used to project the AR image 210 selected at block 430 to a correct location of a base image 225 or the HUD region 130. A homography relates pixel coordinates in two images. Thus, any two images of the same planar surface are related by a homography. Specifically, the rotation and translation between two points of view—one being perpendicular to the ground plane $P_G$ (i.e. a bird's eye view) and the other being either the point of view of the camera that creates the base image 225 or the driver's point of view—is determined at block 440, as further detailed. The process at block 440 requires obtaining information, from block 450, resulting from monitoring the eye 310 or obtaining a base image 225. Then, a point $\vec{Q}$ in the real world is projected to the HUD region 130 or a point $\vec{Q}$ in the real world is projected to the coordinate system of the camera 120 that obtained the base image 225. This process at block 440 is the adjustment of the AR image 210 that considers the relative orientation of the vehicle 100 to the road 160 and is detailed with reference to FIGS. 6 and 7. At block 460, displaying the complete image 230 includes projecting the adjusted AR image 210 in the HUD region 130 or providing the adjusted AR image 210 with the base image 225 in the display 145 or on a screen of a device 115.

Figure 5:
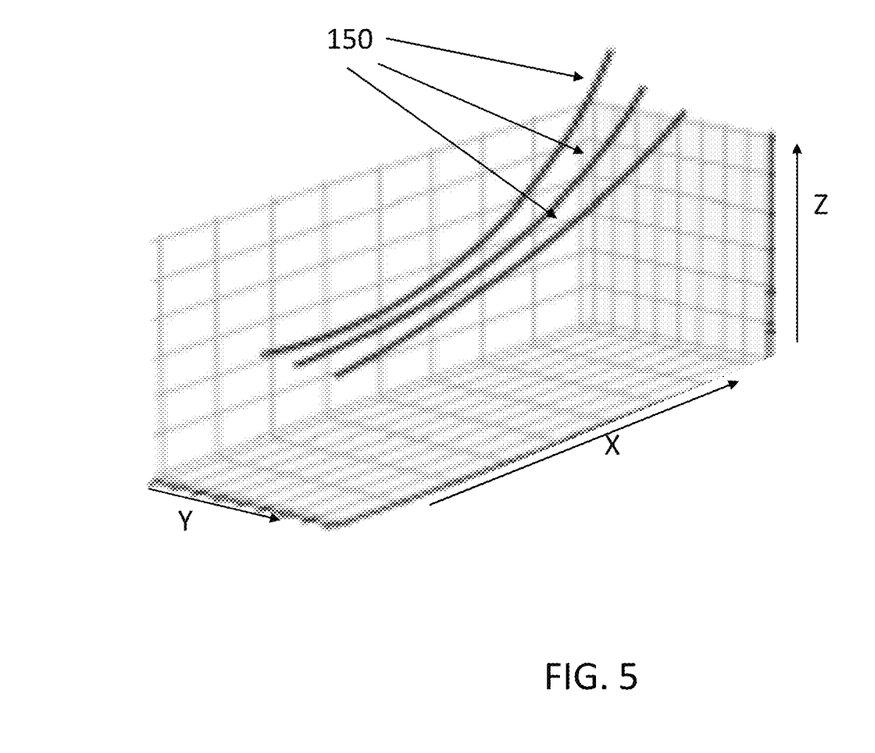
FIG. 5 shows aspects of extracting road geometry to dynamically adjust an AR image according to one or more embodiments.

FIG. 5 shows aspects of extracting road geometry at block 420 (FIG. 4) to dynamically adjust an AR image at block 440 according to one or more embodiments. The single image 220 from one of the front-facing cameras 120, obtained at block 410, is used to detect lane lines 150 in the image 220 in three dimensions. Obtaining three-dimensional lane detection in the coordinate system of the camera 120 that obtained the image 220 is known and not detailed here. The process is described, according to one example, in U.S. application Ser. No. 16/807,735. Based on obtaining the three-dimensional points corresponding with the lane lines 150, interpolation is used to determine a three-dimensional point $\vec{Q}$ ($Q_x$, $Q_y$, $Q_z$) on the road 160 defined by the lane lines 150 (see e.g., FIG. 1). Specifically, from two dimensions of the point $\vec{Q}$ ($Q_x$, $Q_y$) in the coordinate system of the camera 120, the third dimension of the point $\vec{Q}$ ($Q_z$) is obtained via interpolation to account for the elevation of the road 160. Given two dimensions of the point Q (e.g., a point on the surface of the road 160 between lane lines 150), the nearest points in a lane line 150 are found and a weighted elevation $Q_z$ interpolated value is computed. With {P} being a set of nearest points of lane lines 150 to $\vec{Q}$ in the X, Y plane (indicated in FIG. 5), the elevation of $\vec{Q}$ is given by:

$$Q_z = \Sigma_{\vec{p} \in P}(1 - d(\vec{p}, Q_x, Q_y))p_z / \Sigma_{\vec{p} \in P}(1 - d(\vec{p}, Q_x, Q_y)) \qquad [\text{EQ. 1}]$$

In EQ. 1, as indicated, $\vec{p}$ is a point in the set {P}, and the function d gives the Euclidean distance between two dimensions of the point $\vec{p}$ and the point $\vec{Q}$. The function d is given by:

$$d(\vec{p}, Q_x, Q_y) = \sqrt{(p_x - Q_x)^2 + (p_y - Q_y)^2} \qquad [\text{EQ. 2}]$$

Figure 6:
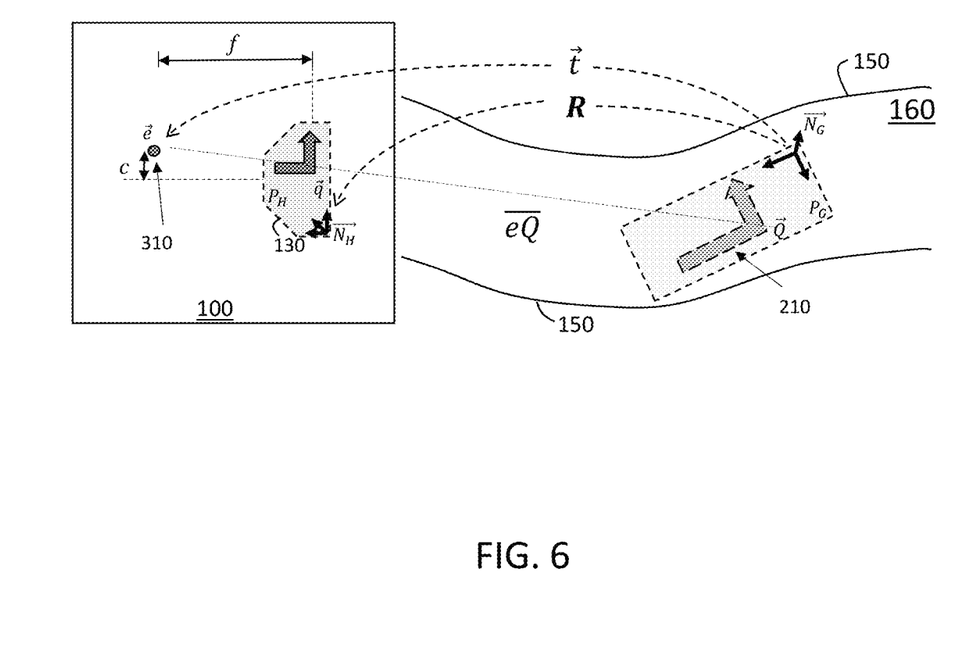
FIG. 6 illustrates operations involved in adjusting an AR image displayed as a head-up display.
Figure 7:
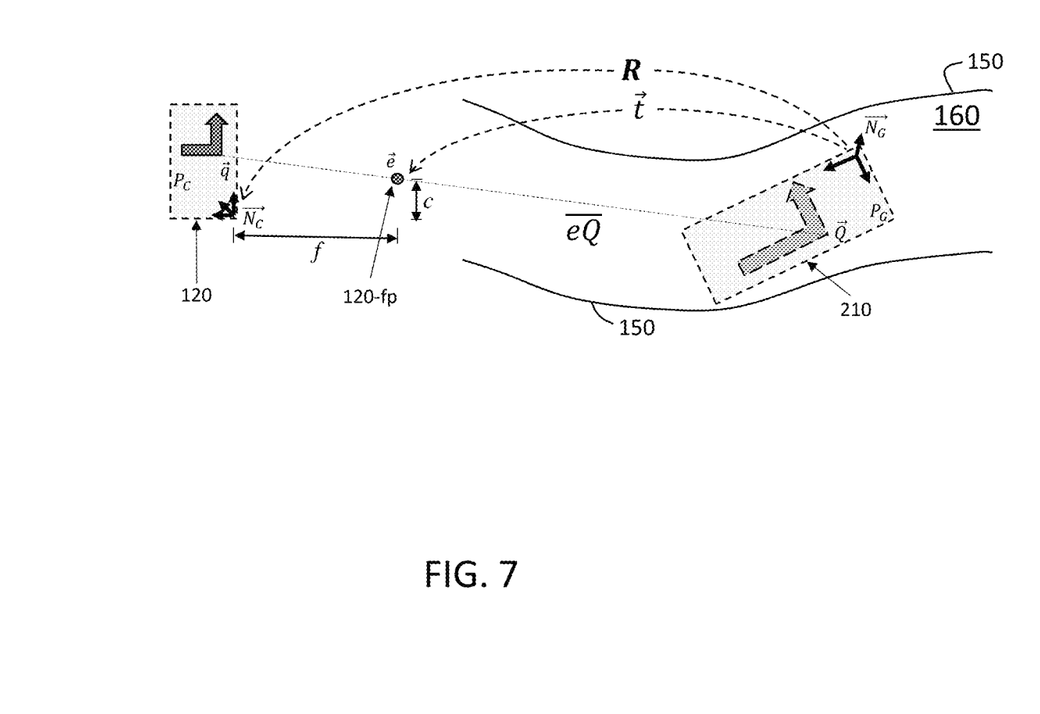
FIG. 7 illustrates operations involved in adjusting an AR image displayed on a base image.

FIGS. 6 and 7 illustrate the factors used in adjusting the AR image 210 based on the relative orientation of the vehicle 100 to the road 160 (assuming that the AR image 210 is projected onto the road 160 or a base image 225 of the road 160). Specifically, adjustment of the AR image 210 involves projecting a point $\vec{Q}$ in the real world (i.e., on the road 160) to a point $\vec{q}$ in the HUD region 130, as shown in FIG. 6, or to a point $\vec{q}$ in the coordinate system of the camera 120 that obtains the base image 225, as shown in FIG. 7. In both FIGS. 6 and 7, lane lines 150 are indicated and the ground plane $P_G$ and the coordinate system $\vec{N_G}$ of the ground (i.e., road 160) are shown with an arrow projected as an exemplary adjusted AR image 210. An exemplary point $\vec{Q}$ on the ground plane $P_G$ is indicated.

In FIG. 6, the location $\vec{e}$ of an eye 310 of the driver 330 in the vehicle 100 is indicated, as is the HUD region 130. The HUD region plane $P_H$ and the coordinate system $\vec{N_H}$ are indicated along with an exemplary point $\vec{q}$ in the HUD region 130. The distance from the location $\vec{e}$ of an eye 310 of the driver 330 to the point $\vec{Q}$ is also indicated as $\vec{eQ}$. The rotation R and translation $\vec{t}$ of the point $\vec{Q}$ in the real world (i.e., on the road 160) provide a corresponding point $\vec{q}$ in the HUD region 130. Specifically, $$\vec{q} = \begin{bmatrix} f_x & 0 & c_x \\ 0 & f_y & c_y \\ 0 & 0 & 1 \end{bmatrix} \cdot [R \; \vec{t}] \cdot \vec{Q} \quad [\text{EQ. 3}]$$

When EQ. 3 is used to adjust an AR image 210 that is displayed in the HUD region 130, f, is a plane distance or two-dimensional distance given by $f_x$ and $f_y$ between the HUD region plane $P_H$ and the location $\vec{e}$ of an eye 310 of the driver 330, as indicated in FIG. 6. In addition, c is the two-dimensional distance, with components $c_x$ and $c_y$, between the eye 310 and the center of the HUD region 130, as also indicated in FIG. 6.

In FIG. 7, the location $\vec{e}$ of the focal point 120-fp of the camera 120 that obtains the base image 225 is indicated. Also indicated is the camera plane $P_C$ and the coordinate system $\vec{N_C}$ along with an exemplary point $\vec{q}$ in the coordinate system $\vec{N_C}$ of the camera 120. The focal length f with components $f_x$ and $f_y$ and the principal point c with components $c_x$ and $c_y$ are also indicated. EQ. 3 can be used to then determine the points $\vec{q}$ for the adjusted AR image 210 in the coordinate system $\vec{N_C}$ of the camera 120 to add the AR image 210 to the correct part of the base image 225.

The process of adjusting the AR image 210 may be made more efficient according to exemplary embodiments. As one example of an efficiency, if an image 220 is obtained farther ahead of the vehicle 100, then the process at block 420 may be performed ahead of the process at block 440. Specifically, a precomputation may be performed:

$$A = [R \; \vec{t}] \cdot \vec{Q} \quad [\text{EQ. 4}]$$

A involves the estimated rotation $R$ and translation $\vec{t}$ of the road 160 with respect to the point of view from which the base image 225 of the road 160 will be captured (when the vehicle 100 is closer to the area obtained by the image 220) and on which the AR image 210 is to be shown, in the exemplary case of a display 145, for example. Then, at the time of display of the AR image 210, it can be confirmed whether the estimated pose A matches, within a specified threshold, the current pose ahead of the vehicle 100. If so, the second part of the computation may be performed as:

$$\vec{q} = \begin{bmatrix} f_x & 0 & c_x \\ 0 & f_y & c_y \\ 0 & 0 & 1 \end{bmatrix} \cdot A \quad [\text{EQ. 5}]$$

Figure 8:
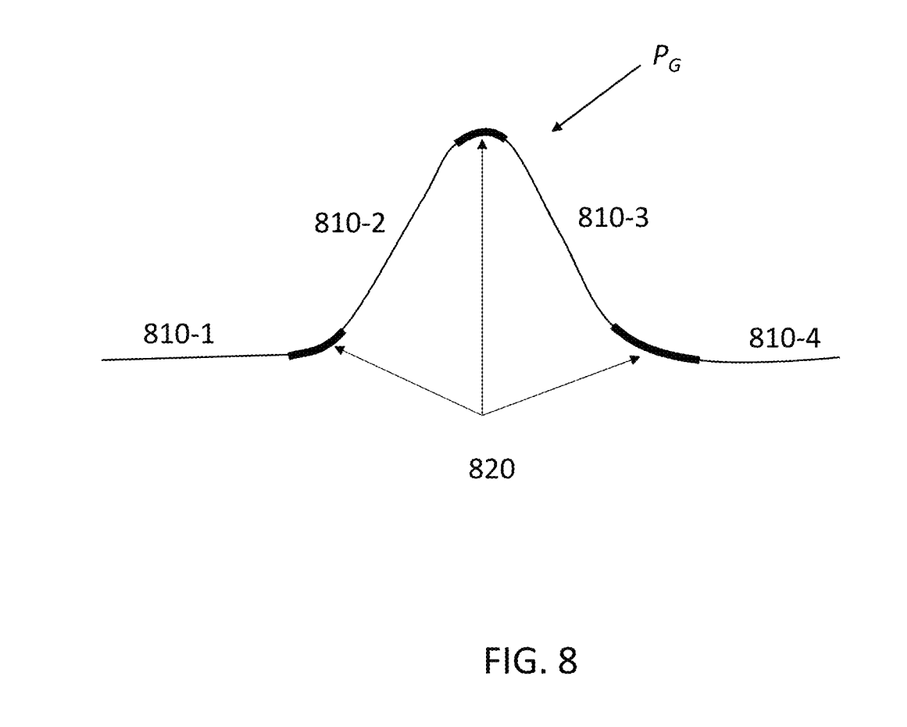
FIG. 8 illustrates the division of a ground plane into sub-planes to improve the efficiency of the adjustment of the AR image according to one or more embodiments.

In this way the lag time associated with the processes of the method 400 may be reduced. FIG. 8 illustrates another efficiency that may be introduced, alone or in combination with the use of EQS. 4 and 5, into the implementation of the method 400 shown in FIG. 4.

FIG. 8 illustrates the division of a ground plane $P_G$ into sub-planes 810 to improve the efficiency of the adjustment of the AR image 210 according to one or more embodiments. As FIG. 8 shows, the exemplary ground plane $P_G$ includes three changes in elevation that result in the four sub-planes 810-1, 810-2, 810-3, 810-4 (generally referred to as 810). Three areas 820 are indicated in FIG. 8 as transition points for the sub-planes 810. Each of these areas 820 exhibits a curvature or change in the gradient of the elevation in the three-dimensional representation of the lane lines 150, as determined at block 420, that exceeds a threshold value. By using the sub-planes 810 rather than the full ground plane $P_G$ at block 440 a small set of homographies (one for each sub-plane 810) is calculated and used to adjust the AR image 210. This results in reduced projection error and feasible computational effort in comparison to a single homography for the full ground plane $P_G$. While calculating an individual projection for each point when using the full ground plane $P_G$ would be accurate, it is computationally infeasible.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system to adjust an augmented reality (AR) image, the system comprising:
    a front-facing camera in a vehicle, the camera configured to obtain an image that includes a road surface ahead of the vehicle; and
    a processor configured to detect lane lines of the road surface in three dimensions, to perform interpolation using the lane lines to determine a ground plane of the road surface, and to adjust the AR image to obtain an adjusted AR image such that all points of the adjusted AR image correspond with points on the ground plane.

2. The system according to claim 1, wherein the processor is further configured to obtain a base image that shows the road surface.

3. The system according to claim 2, wherein the processor is further configured to add the adjusted AR image to the base image for display to a driver of the vehicle.

4. The system according to claim 2, wherein the processor obtains the base image from the camera or a second front-facing camera in the vehicle.

5. The system according to claim 1, wherein the processor is further configured to monitor eye position of a driver of the vehicle.

6. The system according to claim 5, wherein the processor is further configured to determine a head-up display region on a windshield of the vehicle to correspond with the eye position of the driver.

7. The system according to claim 6, wherein the processor is further configured to project the adjusted AR image in the head-up display region.

8. The system according to claim 1, wherein the processor is configured to adjust the AR image based on a rotation and a translation of the points on the ground plane.

9. The system according to claim 1, wherein the processor is further configured to detect an object on the road surface directly ahead of the vehicle from the image.

10. The system according to claim 9, wherein the processor is configured to select or create the adjusted AR image size based on the road surface between the vehicle and a position of the object.

11. A method of adjusting an augmented reality (AR) image, the method comprising:
   obtaining, by a processor, an image from a front-facing camera in a vehicle, the image including a road surface ahead of the vehicle;
   detecting, by the processor, lane lines of the road surface in three dimensions;
   performing, by the processor, interpolation using the lane lines to determine a ground plane of the road surface; and
   adjust, by the processor, the AR image to obtain an adjusted AR image such that all points of the adjusted AR image correspond with points on the ground plane.

12. The method according to claim 11, further comprising obtaining, by the processor, a base image that shows the road surface.

13. The method according to claim 12, further comprising the processor adding the adjusted AR image to the base image for display to a driver of the vehicle.

14. The method according to claim 12, wherein the obtaining the base image is from the camera or a second front-facing camera in the vehicle.

15. The method according to claim 11, further comprising the processor monitoring eye position of a driver of the vehicle.

16. The method according to claim 15, further comprising the processor determining a head-up display region on a windshield of the vehicle to correspond with the eye position of the driver.

17. The method according to claim 16, further comprising the processor projecting the adjusted AR image in the head-up display region.

18. The method according to claim 11, wherein the adjusting the AR image is based on a rotation and a translation of the points on the ground plane.

19. The method according to claim 11, further comprising the processor detecting an object on the road surface directly ahead of the vehicle from the image.

20. The method according to claim 19, further comprising the processor selecting or creating the adjusted AR image size based on the road surface between the vehicle and a position of the object.

* * * * *

UNITED STATES PATENT AND TRADEMARK OFFICE
CERTIFICATE OF CORRECTION

| | |
|---|---|
| PATENT NO. | : 11,562,576 B2 |
| APPLICATION NO. | : 16/985377 |
| DATED | : January 24, 2023 |
| INVENTOR(S) | : Michael Baltaxe |

It is certified that error appears in the above-identified patent and that said Letters Patent is hereby corrected as shown below:

On the Title Page

Item (12) delete "Baitaxe et al." and insert --Baltaxe et al.--.

Item (72) The name of the first inventor should be Michael Baltaxe.

Signed and Sealed this
Seventh Day of May, 2024

Katherine Kelly Vidal
*Director of the United States Patent and Trademark Office*